US010972417B2

(12) United States Patent
Prabhu

(10) Patent No.: US 10,972,417 B2
(45) Date of Patent: *Apr. 6, 2021

(54) DETECTING MESSAGES WITH OFFENSIVE CONTENT

(71) Applicant: Trisha N. Prabhu, Naperville, IL (US)

(72) Inventor: Trisha N. Prabhu, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,140

(22) Filed: Apr. 1, 2019

(65) Prior Publication Data

US 2019/0297042 A1 Sep. 26, 2019

Related U.S. Application Data

(63) Continuation of application No. 15/187,674, filed on Jun. 20, 2016, now Pat. No. 10,250,538, which is a continuation-in-part of application No. 14/738,874, filed on Jun. 13, 2015, now Pat. No. 9,686,217.

(60) Provisional application No. 62/012,296, filed on Jun. 14, 2014.

(51) Int. Cl.
*H04L 12/58* (2006.01)
*G06F 3/0481* (2013.01)
*G06F 3/0484* (2013.01)

(52) U.S. Cl.
CPC .......... *H04L 51/12* (2013.01); *G06F 3/04817* (2013.01); *G06F 3/04842* (2013.01); *H04L 51/046* (2013.01); *H04L 51/063* (2013.01); *H04L 51/32* (2013.01)

(58) Field of Classification Search
CPC ....... H04L 51/043; H04L 51/02; H04L 51/12; G06Q 10/107
See application file for complete search history.

(56) References Cited

U.S. PATENT DOCUMENTS

| | | | |
|---|---|---|---|
| 8,838,719 B1 | 9/2014 | Faulk | |
| 2004/0107089 A1 | 6/2004 | Gross | |
| 2004/0176944 A1 | 9/2004 | Noda | |
| 2006/0242306 A1 | 10/2006 | Boro | |
| 2006/0282369 A1 | 12/2006 | White | |
| 2007/0233787 A1* | 10/2007 | Pagan | G06Q 10/107 709/206 |
| 2008/0134282 A1* | 6/2008 | Fridman | G06Q 10/10 726/1 |
| 2008/0307339 A1 | 12/2008 | Boro | |
| 2009/0019121 A1* | 1/2009 | Mears | G06Q 10/107 709/206 |
| 2009/0113001 A1 | 4/2009 | Manning | |

(Continued)

FOREIGN PATENT DOCUMENTS

| | | |
|---|---|---|
| EP | 09812642 | 9/2009 |
| EP | 2328309 | 6/2011 |

*Primary Examiner* — Aftab N. Khan
(74) *Attorney, Agent, or Firm* — Fish & Richardson P.C.

(57) ABSTRACT

Methods, systems, and apparatus, including computer programs encoded on computer storage medium, to facilitate interception of messages that include offensive content. In one aspect, a method includes actions of receiving input on a user device that includes message content, determining, on the user device, whether the message content includes offensive content, and in response to determining, on the user device, that the message content includes offensive content, generating an alert message for display on the user device that provides an indication that the message includes offensive content.

20 Claims, 10 Drawing Sheets

(56) References Cited

U.S. PATENT DOCUMENTS

| | | | |
|---|---|---|---|
| 2009/0254499 A1* | 10/2009 | Deyo | G06Q 10/10 706/12 |
| 2010/0175129 A1* | 7/2010 | Doddy | G06Q 10/06 726/22 |
| 2010/0280828 A1* | 11/2010 | Fein | G10L 15/1822 704/246 |
| 2011/0145918 A1* | 6/2011 | Jung | G06F 3/0622 726/22 |
| 2011/0191105 A1* | 8/2011 | Spears | G06F 40/10 704/251 |
| 2012/0011192 A1* | 1/2012 | Meister | H04L 51/04 709/203 |
| 2012/0246222 A1* | 9/2012 | Martin | G06Q 30/00 709/203 |
| 2013/0278385 A1 | 10/2013 | Baskin | |
| 2013/0340089 A1 | 12/2013 | Steinberg | |
| 2014/0229557 A1* | 8/2014 | Dietz | H04L 51/12 709/206 |
| 2015/0058242 A1* | 2/2015 | Bucciarelli | H04W 4/14 705/325 |
| 2015/0100913 A1* | 4/2015 | Park | G06F 3/0238 715/773 |
| 2015/0180746 A1* | 6/2015 | Day, II | H04W 4/029 455/405 |
| 2015/0278196 A1* | 10/2015 | Dua | G06F 40/30 704/9 |
| 2015/0312649 A1* | 10/2015 | Gopalan | H04N 21/458 725/32 |
| 2016/0098392 A1 | 4/2016 | Clarke | |
| 2016/0381533 A1 | 12/2016 | Fogelson | |

\* cited by examiner

DETECTING MESSAGES WITH OFFENSIVE CONTENT

CROSS-REFERENCE TO RELATED APPLICATIONS

This application is a continuation of U.S. patent application Ser. No. 15/187,674, filed Jun. 20, 2016, which is a continuation-in-part of U.S. patent application Ser. No. 14/738,874, filed Jun. 13, 2015, now U.S. Pat. No. 9,686,217, issued Jun. 20, 2017, which claims the benefit of U.S. Provisional Patent Application No. 62/012,296, filed Jun. 14, 2014. The disclosure of each are incorporated herein by reference.

BACKGROUND

The instant connectivity provided by network enabled mobile devices has provided a person with a network enabled mobile device with the opportunity to instantly share the person's thoughts and feelings with any other person with a network enabled mobile device. In some instances, this instant connectivity may result in a person transmitting a message in an emotional state that may skew the person's intended message.

SUMMARY

According to one implementation, the subject matter of this specification may be embodied in a method to facilitate interception of messages that include offensive content. The method may include actions for receiving input on a user device that includes message content, determining, on the user device, whether the message content includes offensive content, and in response to determining, on the user device, that the message content includes offensive content, generating an alert message for display on the user device that provides an indication that the message includes offensive content.

Other versions include corresponding systems, apparatus, and computer programs to perform actions of methods, encoded on computer storage devices.

These and other versions may optionally include one or more of the following features. For instance, in some implementations, determining, on the user device, whether the message includes offensive content includes obtaining at least a portion of the message content, and determining whether the obtained message content includes an offensive trigger word.

Alternatively, or in addition, determining, on the user device, whether the message includes offensive content may include obtaining at least a portion of the message content, determining whether the obtained message content includes an offensive trigger word, and in response to determining whether the obtained message includes an offensive trigger word, analyzing the context in which the offensive trigger word is used, wherein analyzing the context in which the offensive trigger word is used includes: determining whether the offensive trigger word falls within a predetermined proximity of (i) a pronoun that refers to a person other than the user of the user device or (ii) an entity name that refers to a person other than the user of the user device.

Alternatively, or in addition, determining, on the user device, whether the message includes offensive content may include obtaining at least a portion of the message content, processing the obtained message content by a neural network that has been trained using multiple content items that have been labeled as offensive content items and multiple content items that have been labeled as non-offensive content items, receiving a value from the neural network that has been trained using multiple content items that have been labeled as offensive content items and multiple content items that have been labeled as non-offensive content items, and determining, based on the value received from the neural network, whether the message content includes offensive content.

In these, or other implementations, the alert message includes one or more options for interacting with the message that includes offensive content. The one or more options for interacting with the message that includes offensive content may include (i) discarding the message that includes offensive content, (ii) sending the message that includes offensive content, and (iii) editing the message that includes offensive content.

In these, or other implementations, the method may also include receiving a selection, on the user device, of an option that corresponds to editing the message that includes offensive content, receiving input, on the user device, that replaces an offensive portion of the message with a non-offensive portion, and generating, on the user device, a positive keyword log entry that stores at least (i) the offensive portion of the message and (ii) the non-offensive portion of the message.

The details of these, and other, implementations are set forth in the accompanying drawings and the description below. Other features and advantages will be apparent from the description and drawings, and from the claims.

DETAILED DESCRIPTION

Aspects of the present disclosure provide a system and method for detecting messages that may include offensive content. In some aspects, features of the present disclosure may alert a user that a message with offensive content has been detected. The alert may provide the user with one or more options for interacting with the offensive message prior to the sending, or receipt of, the offensive message.

Interacting with the offensive message may include, for example, editing the message, discarding the message, transmitting the message, or the like.

Figure 1:
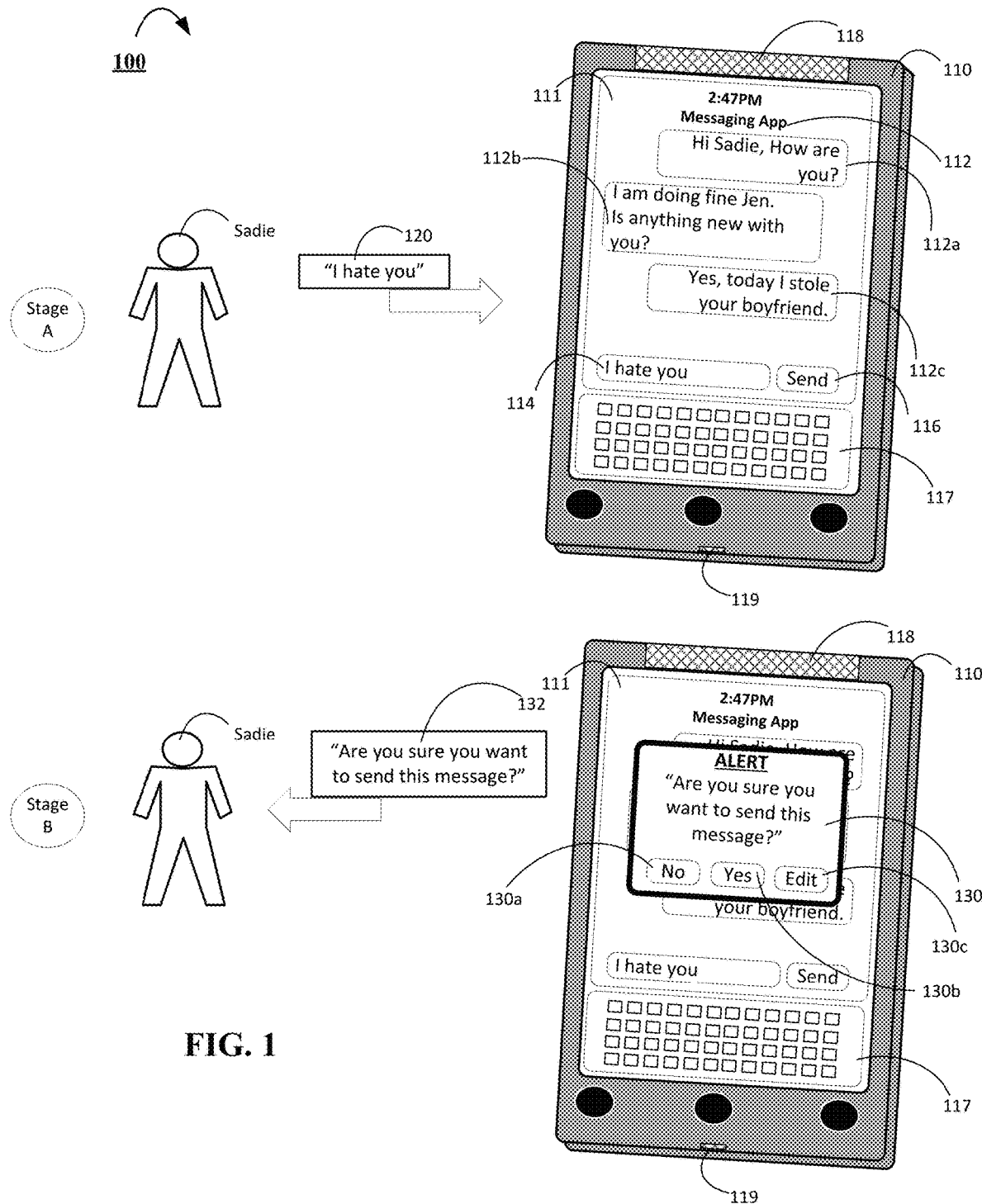
FIG. 1 is an example of analyzing a message for offensive content.

FIG. 1 is an example 100 of analyzing a message for offensive content. In the example 100, a user named Sadie is using a messaging application 112 executing on a user device 110 in order to exchange messages such as messages 112a, 112b, 112c with another user named Jen. The user device 110 has been enhanced so that it can intercept messages that include offensive content in a manner that is consistent with the present disclosure.

Sadie can send a message to Jen by entering a message that may include, for example, a set of one or more characters of a message into the text box 114 using a keyboard 117 that is installed on the enhanced user device 110. The keyboard 117 may be a default keyboard that was part of the standard software package installed on the enhanced user device 110. Alternatively, the keyboard 117 may be a custom keyboard that includes one or more software units that can analyze messages for offensive content. Alternatively, or in addition, in some implementations, Sadie can enter a message into the text box 114 by uttering a voice command that is captured by a microphone 119 of the mobile device 110.

The user may transmit the message entered into the text box 114 by selecting the send button 116 using, e.g., a finger tap on a graphical user interface 111 of the enhanced user device 110. In some instances, after the send button 116 is selected, the message residing within the text box 114 can be transmitted from Sadie's enhanced user device 110 to a user device of a recipient user such as Jen. After the message is transmitted to another user device such as Jen's user device, the message may be displayed on the graphical user interface 111 of Sadie's enhanced user device 110. In one implementation, the messages such as messages 112a, 112b, 112c may be displayed in order of their occurrence in manner that forms a transcript of the conversation that is occurring between Sadie and Jen.

In one implementation, Sadie's enhanced user device 110 can be configured to analyze messages that are sent from Sadie's enhanced user device 110. For instance, at stage A of example 100, Sadie may become angry by one or more messages received from Jen. For instance, Sadie may become upset at message 112c where Jen tells Sadie that Jen stole Sadie's boyfriend today. While angry, Sadie may not be thinking clearly, and in an angered emotional state, Sadie may enter the message 120 into her enhanced user device 110 that recites "I hate you." Next, while still angry, Sadie may tap the send button 116 in order to initiate transmission of the message "I hate you" to Jen.

At Stage B, Sadie's enhanced user device 110 can analyze the message 120 input into text box 114, and determine whether the message includes offensive content. Sadie's enhanced user device 110 may determine whether the message 120 includes offensive content by analyzing the words of the message 120 to determine whether the message 120 includes one or more potentially offensive trigger words, analyze the context in which one or more potentially offensive trigger words are used, analyze the message sentiment, or a combination thereof. With reference to example 100, Sadie's enhanced user device 110 may determine that message 120 is offensive because the message 120 includes the offensive trigger word "hate" in a context that is determined to be offensive. The offensive trigger word "hate" may be determined to be used in a context that is offensive because, for example, the enhanced user device 110 determines that Sadie used the offensive trigger word "hate" in the message 120 within a predetermined proximity of a pronoun that refers to someone other than Sadie. For instance, in one implementation the enhanced user device 100 may determine that the offensive trigger word "hate" is used in a context that is offensive because the offensive trigger word "hate" is within a predetermined proximity of a pronoun that refers to the recipient of the message.

In response to detecting that the message 120 includes offensive content, Sadie's enhanced user device 110 can generate an alert 130 that gives Sadie the opportunity to reconsider whether she wants to send message 120 to Jen. For example, the alert 130 can provide a prompt that asks Sadie "Are you sure you want to send this message?". Such an alert 130 may provide Sadie with the opportunity to calm down, and rethink whether she wants to send the message 120 to Jen. Alternatively, or in addition, the alert 130 may provide Sadie with one or more options for interacting with the message 120. For example, the alert 130 may include one or more selectable icons that allow Sadie to discard the message 130a, send the message 130b, or edit the message 130c when each respective selectable icon is selected.

As described above, the alert 130 may be an interactive graphical alert that is provided on the display of the enhanced user device 110. Alternatively, or in addition, the question displayed by the prompt may also be an audible output 132 from a speaker 118 of the enhanced user device 110.

Figure 2:
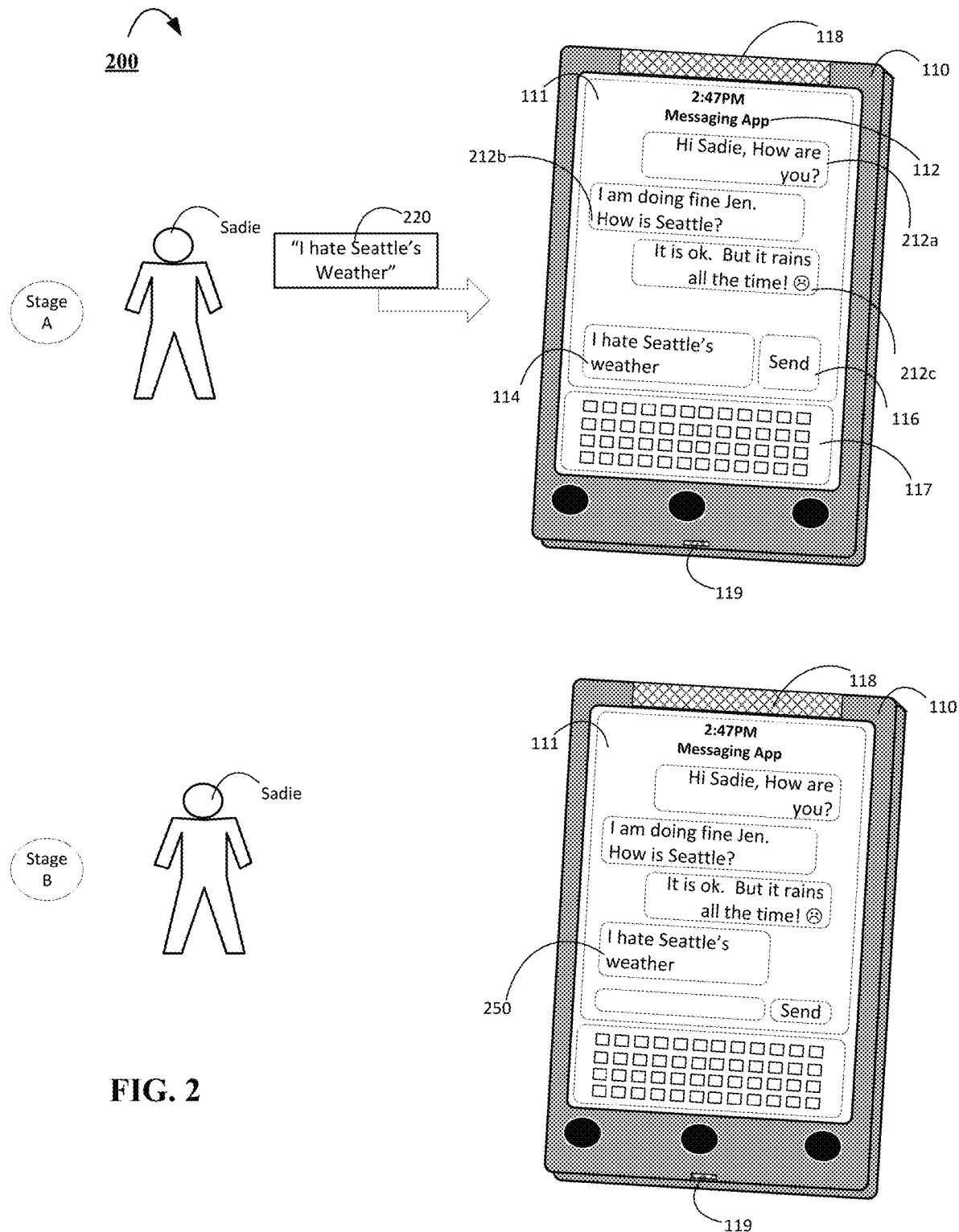
FIG. 2 is another example of analyzing a message for offensive content.

FIG. 2 is another example 200 of analyzing a message for offensive content. The example 200 is similar to example 100 because Sadie uses the same enhanced user device 110 executing the same messaging application 112 in order to exchange messages with the same user Jen. However, in the example 200, a message 220 that includes an offensive trigger word "hate" does not result in the generation of an alert that asks Sadie to rethink whether Sadie wants to send the message to Jen.

For instance, at Stage A of example 200, Sadie may carry on a conversation with Jen that includes messages 212a, 212b, 212c related to Seattle. The messages in example 200 show Sadie asking Jen "How is Seattle?". Continuing the conversation, Jen indicates that "It is ok. But it rains all the time!". In response, Sadie inputs a message 220 into the text box 114 of Sadie's device 110 that recites "I hate Seattle's weather." After entering message 220 into the text box 114, Sadie taps the send button 116 to initiate transmission of the message "I hate Seattle's weather" to Jen.

At Stage B, Sadie's enhanced user device 110 can analyze the message 220 input into text box 114, and determine whether the message includes offensive content in the same manner as described with respect to example 100. With reference to example 200, the enhanced user device 110 can determine that the message 220 includes an offensive trigger word "hate." However, in example 200, the enhanced user device 110 can determined that the message 220 is not an offensive message based on the context of the offensive trigger word "hate." For instance, the enhanced user device 110 can determine that the offensive trigger word "hate" is not within a predetermined proximity of a pronoun that is associated with a person other than Sadie, who sent the message. Alternatively, or in addition, the enhanced user device 110 may determine that the offensive trigger word "hate" was not within a predetermined proximity of the name of a person other than Sadie. Accordingly, the enhanced user device delivers the message 220 which is displayed on the graphical user interface 111 in the conversation between Sadie and Jen as message 250 when the message is transmitted from Sadie's enhanced user device 110 to Jen's device.

Figure 3:
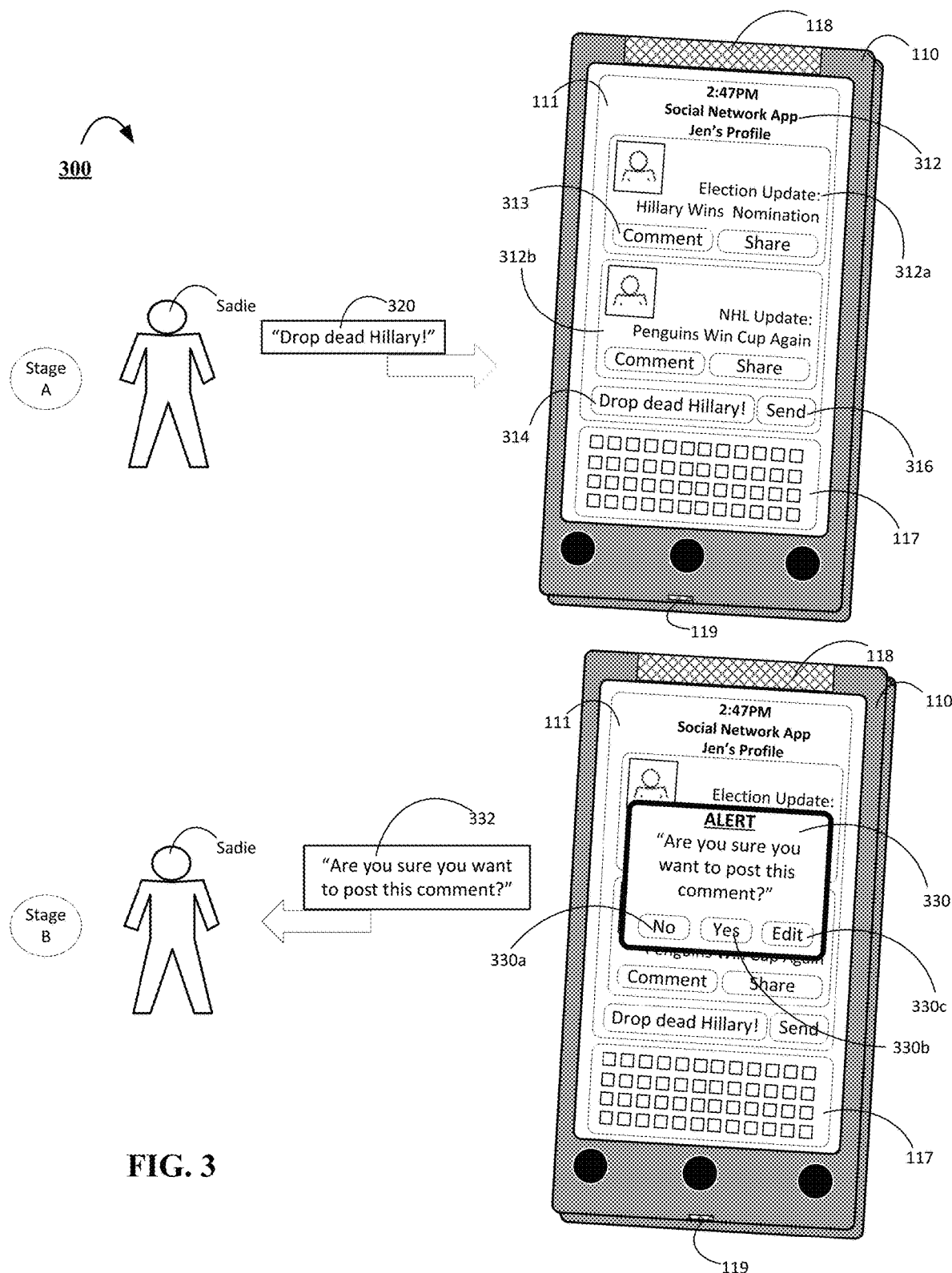
FIG. 3 is another example of analyzing a message for offensive content.

FIG. 3 is another example 300 of analyzing a message for offensive content. Example 300 is similar to examples 100 and 200 because Sadie uses the same enhanced user device 100 to send an electronic communication to Jen. However, in example 300, Sadie is communicating a message in the form of a comment related to a content item posted on Jen's social media page via a social media application 312 executing on Sadie's enhanced mobile device 110.

Sadie can submit a comment on a content item such as content items 312a, 312b posted by Jen to Jen's social media page. Sadie may submit a comment to a content item 312a by, for example, tapping the selectable comment icon 313 and then entering a set of one or more characters into the text box 314 using a keyboard 117 that is installed on the enhanced user device 110. The keyboard 117 may be a default keyboard that was part of the standard software package installed on the enhanced user device 110. Alternatively, the keyboard 117 may be a custom keyboard that includes one or more software units that can analyze comments for offensive content. Alternatively, or in addition, in some implementations, Sadie can enter a comment into the text box 314 by uttering a voice command that is captured by a microphone 119 of the mobile device 110.

Sadie may initiate communication of the comment entered into the text box 314 by selecting the send button 316 using, e.g., a finger tap on a graphical user interface 111 of the enhanced user device 110. In some instances, after the send button 116 is selected, the one or more characters residing within the text box 114 are transmitted from Sadie's enhanced user device 110 to a server computer associated with the provider of the social media application 312, and posted to a corresponding content item on Jen's social media profile page.

In one implementation, Sadie's enhanced user device 110 can be configured to analyze the comment that Sadie tries to submit for positing on a social media page in the same manner as described above with respect to messages sent from the messaging application. For instance, at stage A of example 300, Sadie may become angry when browsing content items posted to Jen's social media page. For instance, Sadie, an avid conservative, may become angry upon viewing the content item on Jen's social media page indicating that "Hillary wins Nomination." Angering Sadie further is the fact that Sadie knows Jen is an avid Hillary Clinton supporter. Consumed with anger, and wanting to hurt Jen and Hillary Clinton at the same time, Sadie enters the comment 320 "Drop dead Hillary!" into text box 314 and taps the send button 316.

At Stage B of example 300, Sadie's enhanced user device 110 can analyze the comment 320 input into the text box 314, and determine whether the comment 320 includes offensive content. The enhanced user device 110 may determine whether the comment 320 includes offensive content in the same, or substantially similar, manner as described with respect to examples 100, 200. With reference to example 300, the enhanced user device 110 can determine that the message 320 includes an offensive trigger word "dead." In addition, the enhanced user device 110 may determine that the offensive trigger word "dead" is within a predetermined proximity of the name of a person such as Hillary that is someone other than the sender of the message. Accordingly, the enhanced user device 110 can conclude that the comment 320 includes offensive content.

In response to detecting that the comment 320 includes offensive content, Sadie's enhanced user device 110 can generate an alert 330 that gives Sadie the opportunity to reconsider whether she wants to post the comment 320 to the content item 312a on Jen's social media page. For example, the alert 330 can provide a prompt that asks Sadie "Are you sure you want to post this comment?". Such an alert 330 may provide Sadie with the opportunity to calm down, and rethink whether she wants to post the comment 320 to content item 312a on Jen's social media page. Alternatively, or in addition, the alert 330 may provide Sadie with one or more options for interacting with the comment 320. For example, the alert 330 may include one or more selectable icons that allow Sadie to discard the comment 330a, post the comment 330b, or edit the comment 330c when each respective selectable icon is selected.

Figure 4:
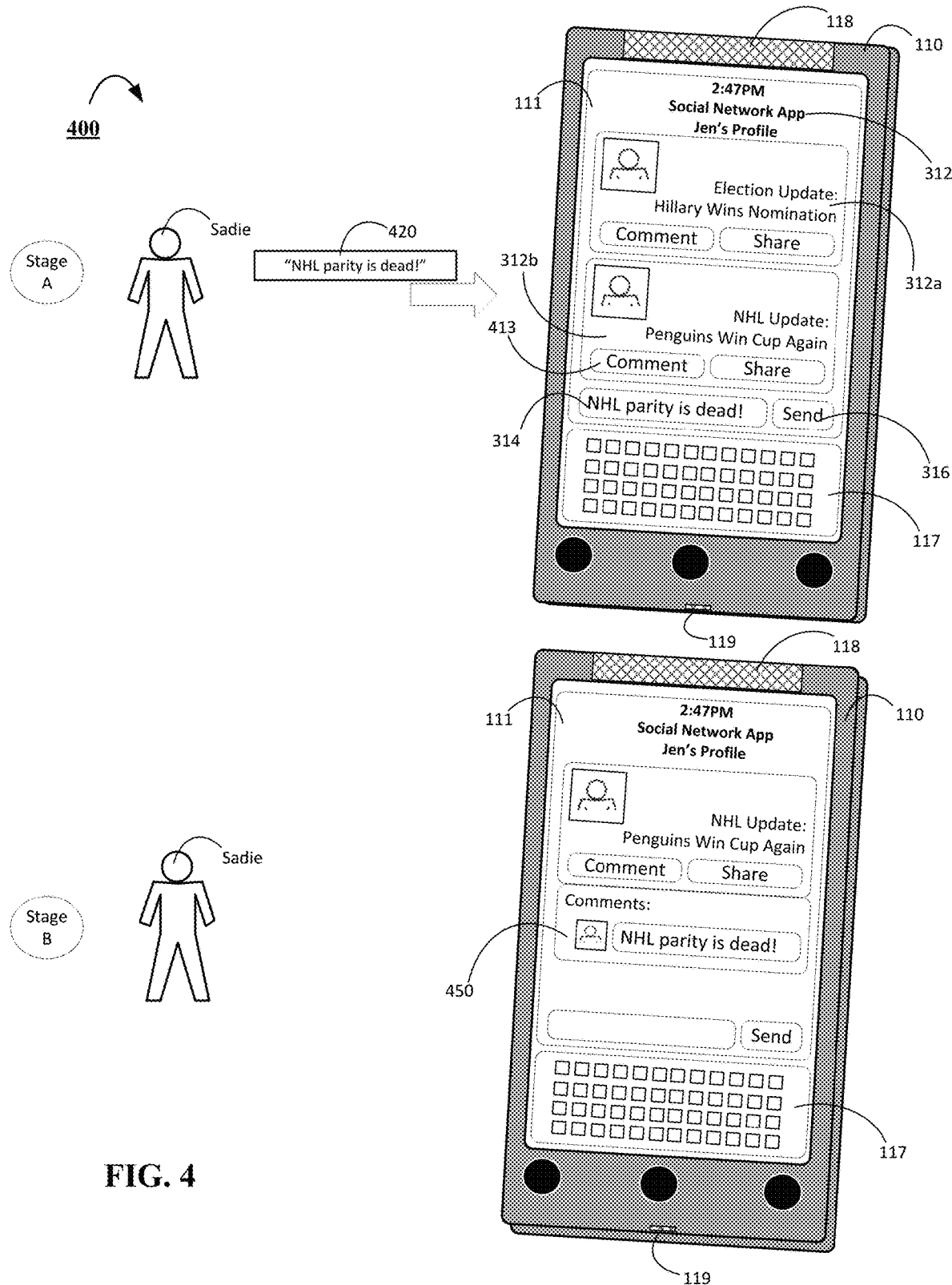
FIG. 4 is another example of analyzing a message for offensive content.

FIG. 4 is another example 400 of analyzing a message for offensive content. Example 400 is similar to example 300 because Sadie uses the same enhanced user device 110 executing the same social media application 312 in order to post a comment to a content item displayed on Jen's social media page. However, in the example 400, a comment that includes an offensive trigger word "dead" does not result in the generation of an alert that asks Sadie to rethink whether Sadie wants to post a comment to a content item displayed on Jen's social media page.

For instance, at Stage A of example 400, Sadie may browse the content items displayed on Jen's social media page such as a news article indicating that the Pittsburgh Penguins of the National Hockey League won the Stanley Cup again. Sadie can tap the selectable comment icon 413, and enter a comment 420 into the text box 314 that recites "NHL parity is dead!". After entering the comment 420 into the text box 314, Sadie can tap the send button 316 to post the comment to the content item 312b on Jen's social media page.

At Stage B of example 400, Sadie's enhanced user device 110 can analyze the comment 420 input into text box 314, and determine whether the comment 420 includes offensive content in the same manner described with respect to example 300. With reference to example 400, the enhanced user device 110 can determine that the comment includes the offensive trigger word "dead." However, in the example 400, the enhanced user device 110 can determine that the comment 420 is not an offensive comment based on the context of the offensive trigger "dead." For instance, the enhanced user device 110 can determine that the offensive trigger word "dead" is not within a predetermined proximity of a pronoun that is associated with a person other than Sadie, who sent entered the comment. Accordingly, the enhanced user device 110 may communicate the comment 420 to a server associated with a provider of the social media application, and the comment 420 may be posted to the content item 312b on Jen's social media page and displayed as comment 450.

Figure 5:
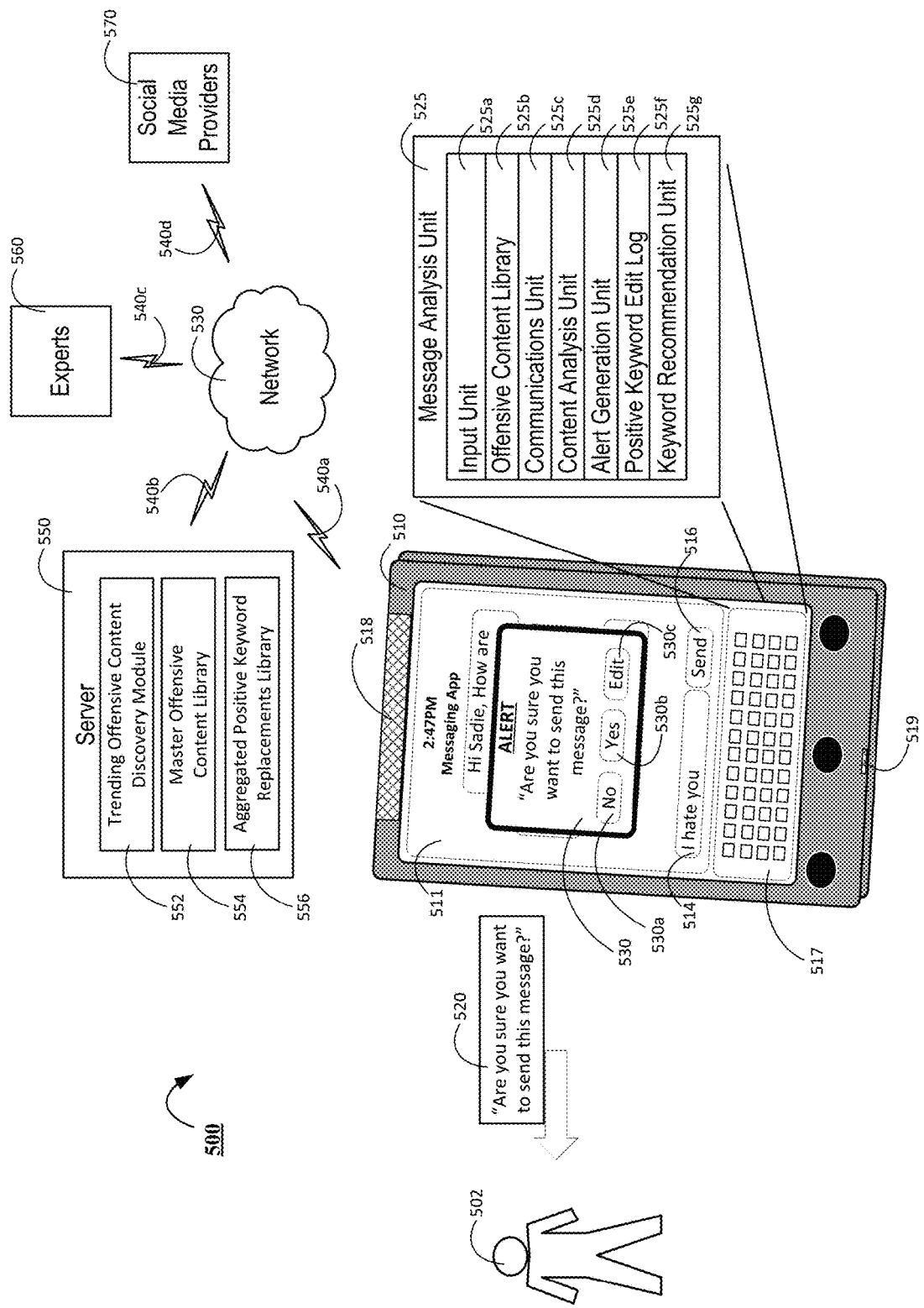
FIG. 5 is a block diagram of an example of a system for analyzing a message for offensive content.

FIG. 5 is a block diagram of an example of a system 500 for analyzing a message for offensive content. The system 500 may include a user device 510, a network 530, one or more communication links 540a, 540b, 540c, 540d, one or more servers 550, one or more expert computers 560, and one or more social media providers 570.

The user device 510 may include a graphical user interface 511, an input keyboard 517, a speaker 518, and a microphone 519. The keyboard 517 may be a software keyboard, where each key of the keyboard 517 is a selectable icon that is displayed on the graphical user interface 511. Alternatively, the keyboard 517 may include a physical keyboard made up of physical keys. A user 502 of the user device 510 can input one or more characters into a text box 514 by tapping one or more corresponding keys of the keyboard 517. Alternatively, or in addition, in some implementations, a user 502 may enter input into the text box 514 by uttering a voice command that is detected by the microphone 519.

The user device 510 of system 500 is an enhanced user device. The user device 510 is enhanced because the user device 510 includes a message analysis unit 525. The message analysis unit 525 facilitates interception and analysis of messages transmitted using the user device 510 for the purpose of alerting a user 502 of the user device 510 of the existence of offensive content in a message sent, or received, by the user 502. The message analysis unit 525 includes an input unit 525a, an offensive content library 525b, a communications unit 525c, a content analysis unit 525d, an alert generation unit 525e, a positive keyword edit log 525f, and a keyword recommendation unit 525g. In one implementation, the message analysis unit 525 may be integrated into a software keyboard 517. In such instances, the message analysis unit 525 may be installed onto the user device 510 by installing a custom keyboard that includes the message analysis unit 525. Alternatively, however, the message analysis unit 525 may be installed onto the user device 510 independent of the keyboard 517 as part of the operating system of the device 510.

The input unit 525a can be configured to obtain message data that is input into text box 514 as a string one or more characters. A message may include, for example, a text message, a social media post, a social media comment on a post, or the like. In some implementations, the input unit 525a may capture a message input into the user device 510 by obtaining and caching keystrokes on a keystroke-by-keystroke basis. Alternatively, or in addition, the input unit 525a may be configured to obtain portions of a message inputted on a word-by-word basis. For instance, the input unit 525a may obtain a portion of the message each time a user keys the space bar of the keyboard 517. Alternatively, or in addition, however, input unit 525a may be configured to obtain the entire contents of the text box 514 at the time a user taps the send button 516.

In some instances, message data may include an image, video, audio, or a combination thereof. In such instances, the input unit 525a may be configured to obtain one or more of the image, the video, the audio, the metadata associated therewith, or a combination thereof.

The offensive content library 525b may include a library of content that is determined to be potentially offensive. Content that may be determined to be potentially offensive may include, for example, offensive words, offensive phrases, or the like. Examples of offensive words or offensive phrases may include, for example, profanity. Alternatively, or in addition, offensive words or offensive phrases may include, for example, words or phrases related to one's looks, behavior, race, ethnicity, or the like. Alternatively, or in addition, some implementations may use the offensive content library 525b to store images, videos, audio, or metadata associated therewith that are determined to be potentially offensive.

An initial version of the offensive content library 525b may be obtained with the initial download, or installation, of the message analysis unit 525. However, it is also contemplated that the offensive content library 525b may be periodically updated over time. Such periodic updates of the offensive content library may be important because the meaning of certain words and phrases may change over time. For instance, words that were offensive in the past may not be offensive in the future. Similarly, words that may not have been offensive in the past may later be used a particular way in the future that becomes offensive. Alternatively, or in addition, new offensive words may also be created in the future that could not have been contemplated at the time of generation of any particular version of the offensive content library 525. Accordingly, it is important for the offensive content library 525b to be updated to include, or remove, words based on societal trends.

The offensive content library may be updated by using the communications unit 525c to connect to the server 550 that maintains a master offensive content library 554. The communications unit 525c may include a network interface to facilitate communications between the message analysis unit and the server 550 through a network 530 using one or more communication links 540a, 540b, 540c, 540d. Once connected to the server 550, the communication unit 525c may facilitate updates to the offensive content library 525b based on the server's 550 master offensive content library 554. For instance, an update to the offensive content library 525b may include synching the offensive content library 525b with the master offensive content library 554 in a manner that ensures that all changes made to the master offensive content library 554 since the last update to the offensive content library 525b be propagated to the offensive content library 525b.

When performing an update, the communications unit 525c may download all, or a portion of, the master offensive content library 554 to replace all, or a portion of, the offensive content library 525b maintained by the message analysis unit 525 on user device 510. In some instances, the updates to the offensive content library 525b may be periodically scheduled. For instance, updates to the offensive content library 525b may be fully updated based on the current state of the master offensive content library 554 once a week, once month, or the like. Alternatively, or in addition, the offensive content library 525b may be incrementally updated multiple nights a week, or even every night, in an effort to keep the offensive content library 525b as up-to-date as possible.

The content analysis unit 525d may analyze messages that have been sent by the user of the user device 510. The content analysis unit 525d may be capable of analyzing a particular message in one or more different ways. For instance, the content analysis unit may analyze the words of a message to determine whether the message includes one or more potentially offensive trigger words. Alternatively, or in addition, the content analysis unit may perform a contextual analysis of a message. Contextual analysis of a message may analyze, for example, the context in which a potentially offensive trigger word is used. Alternatively, or in addition, the content analysis unit may perform an analysis of a message's sentiment. In one implementation, determining a message's sentiment may include the use of artificial intelligence techniques such as machine learning.

The content analysis unit 525d may be configured to receive all, or a portion, of the message that was obtained by the input unit 525a. The portion of the message received from the input unit 525a may be analyzed to determine whether the received portion of the message corresponds to one or more offensive trigger words maintained in the offensive content library 525b. The content analysis unit 525d may determine that the portion of the message corresponds to one or more offensive trigger words maintained in the offensive content library 525b by, e.g., searching the offensive content library 525b based on the portion of the message received from the input unit 525a.

In one implementation, the content analysis unit 525d may receive data indicative of a particular character for each occurrence of a user 502 tap on a keyboard such as keyboard 517 when a user is typing a message into text box 514. In such instances, the content analysis unit 525d may perform a search of the offensive content library 525b for each character that is received. By way of example, if a user types the word "hate" into the text box 514, the content analysis unit 525d may search the offensive content library 525b for an "h" after the user 502 taps the "h" on the keyboard 517. Then, the content analysis unit 525d may search the offensive content library 525b for "ha" after the user taps the "a" on the keyboard 517. Similarly, the content analysis unit 525d may search the offensive content library 525b for "hat" after the user taps the "t" on the keyboard 517. Finally, the content analysis unit 525d may again search the offensive content library 525b for "hate" after the user taps the "e" on the keyboard 517.

Alternatively, or in addition, the content analysis unit 525d may search the offensive content library 525b once it is determined that user 502 has completed entering an entire word. For instance, the content analysis unit 525d may initiate a search of the offensive content library 525b when the content analysis unit determines that the user 502 has tapped the spacebar, a punctuation mark, or the like.

Alternatively, or in addition, the content analysis unit 525d may search the offensive content library 525b after a user 502 attempts to initiate transmission of a message. For instance, the content analysis unit 525d may search the offensive content library 525b based on one or more portions of a message after a user 502 taps the "send" button 516.

In some implementations, the mere detection of an offensive trigger word in a message may result in the content analysis unit 525d instructing the alert generation unit 525e to generate an alert such as alert 530. Alternatively, in some implementations, the content analysis unit 525d may need to perform further analysis of the message before determining that the alert generation unit 525e should be instructed to display an alert 530. For instance, the content analysis unit 525d may need to further analyze the message to determine the context in which an offensive trigger word was used. Alternatively, or in addition, the content analysis unit 525d may need to analyze the message's sentiment.

The content analysis unit 525d may analyze the context in which the offensive trigger word was used in the message by determining whether a detected offensive trigger word falls within a predetermined proximity of one or more other words in a message. With respect to outgoing messages, the content analysis unit 525d may determine whether the offensive content trigger word falls within a predetermined proximity of either a pronoun or entity name that refers to someone other than the user device 510. Such analysis may require disambiguation of the pronoun or entity name. An entity name may include, for example, the name of a person, the nickname of a person, the name of an organization, or the like.

In one implementation, the content analysis unit 525d may transmit one or more detected pronouns or entity names to a disambiguation unit that can determine the particular entity to which each of the one or more pronouns or entity names corresponds. The disambiguation unit may return data to the content analysis unit 525d that identifies the entity to which each of the one or more pronouns or entity names corresponds to the content analysis unit 525d. For instance, the disambiguation unit may return data indicating whether the pronoun or entity name corresponds to the sender of the message, the recipient of the message, or neither. The content analysis unit 525d can receive the data identifying the entity to which the pronoun corresponds and determine whether the identified entity is different than the sender of the message. If the identified entity is different than the sender of the message, the content analysis unit 525d can then proceed to evaluate the proximity between the offensive trigger word and the pronoun or entity name that corresponds to the identified entity.

In one implementation, the predetermined proximity may require that the offensive trigger word and pronoun or entity name that correspond to the identified entity are adjacent. In another implementation, the predetermined proximity may require that the offensive trigger word and the pronoun or entity name that corresponds to the identified entity be less than two words apart. However, the present disclosure need not be so limited. Instead, the predetermined proximity may be set to any distance between the offensive trigger word and the pronoun or entity name that corresponds to the identified entity.

In some instances, if it is determined that an offensive trigger word within a message falls within a predetermined proximity of the pronoun or entity name that corresponds to the identified entity, the message can be deemed offensive. In such instances, the content analysis unit 525d may instruct the alert generation unit 525e to generate an alert such as alert 530. Alternatively, if it is determined that the offensive trigger word does not fall within a predetermined proximity of a pronoun or entity name that corresponds to the identified entity, the message may be deemed to be not offensive. In such an instance, an alert 530 will not be generated.

In the same, or other implementations, the content analysis unit 525d may analyze the sentiment of a message. In one implementation, the content analysis unit 525d may analyze the sentiment of a message using a machine learning system that has been trained to classify messages as either offensive or non-offensive. For instance, the content analysis unit 525d may employ a neural network that has been trained offline using a set of labeled training data. The training data used to train the neural network may include large data sets that include multiple offensive content items that are labeled as "offensive" such as offensive words, offensive phrases, offensive images, offensive videos, offensive audios, or the like. Similarly, the training data may also include large data sets that include multiple non-offensive content items that include non-offensive words, non-offensive phrases, non-offensive images, non-offensive videos, non-offensive audios, or the like. The offline training of the neural network may result in a neural network that can receive a content item such as a word, phrase, image, audio, or video, process the content item, and generate a value indicative of the likelihood that the processed item is offensive. Given the binary nature of the problem that the neural network was trained to perform, the output of the neural network trained in the aforementioned manner may be evaluated using a predetermined threshold. For instance, if the value output by the neural network exceeds a predetermined threshold, then it may be determined that the processed content item is offensive. If, on the other hand, the value output by the neural network does not exceed the predetermined threshold, then the content item may be determined to be non-offensive.

Once trained, the aforementioned neural network may be installed on the user device 510 and brought online. The content analysis unit 525d may receive one or more portions of the message obtained by the input unit 525a. In one implementation, one or more portions of the received message may include text, an image, an audio, a video, or a combination thereof. The content analysis unit 525d may provide one or more of the received portions of the message to the trained neural network. The neural network may process one or more of the received portions of the message and generate a value that is indicative of whether each respective processed portion of the message includes offensive content. The content analysis unit 525d may determine whether or not the message includes offensive content based on the value generated by the neural network. Though the use of such a trained neural network provides benefits with respect to detecting whether text portions of messages include offensive content, such trained neural networks may be particularly beneficial when using the content analysis unit 525 to determine whether images, messages, or audio include offensive content.

Alert generation unit 525e can generate alerts that can be presented to a user in response to a determination, by the content analysis unit 525d, that a message includes offensive content. The alerts, such as alert 530, may ask a user to confirm whether the user wants to send the message. The alert may be graphically displayed on the graphical user interface 511 in a manner that provides a visual alert to a user. Alternatively, or in addition, the alert may be an audio alert 520 that is output via a speaker 518 of the user device 510 that asks a user 520 "Are you sure you want to send this message?".

In one implementation, generated alerts may indicate to the user that the reason for the alert is that the message the user 520 tried to send includes offensive content. The alert may include information that makes the user 520 aware of the potentially negative effects that such an offensive message may have on the recipient. Such information may be conveyed in one or more sentences of textual information. Alternatively, or in addition, the alert may include video, or a link to a video, that provides a description of the effect that such an offensive message may have on the recipient. Alternatively, or in addition, the alert may include an audio message, or a link to an audio message, that provides a description of the effect that such an offensive message may have on the recipient. Such information that provides the user 520 with a description of the effects that an offensive message may have on the recipient may dissuade the user 520 from confirming that the message with offensive content should be sent to a recipient.

The alert generation unit 525e may generate alerts that include one or more options for interacting with a message that has been determined to include offensive content. For instance, an alert may include one or more selectable icons that a user 502 can select in order to discard the message 530a, confirm that the message should be sent 530b, or edit the message 530c. In response to the selection of selectable icon 530a, the message analysis unit 525 may delete the offensive message without sending the offensive message. In response to the selection of selectable icon 530b, the message analysis unit 525 may send the offensive message to a recipient.

In response to the selection of selectable icon 530c, the message analysis unit may give the user the opportunity to edit the offensive message. For instance, upon selection of the selectable icon 530c, the message analysis unit may return the user to a text editor such as text box 514 that facilitates modification of the message's offensive content. The text editor may be configured to receive inputs from the user 502 that edit the content of the offensive message. The text editor may include at least one selectable icon that, when selected, instructs the device 510 to send the edited message to a recipient. In such instances, the edited message may be analyzed by the message analysis unit 525 in the same manner as the original message. If the edited message is determined to include offensive content, then another alert 530 may be generated, as described above. Such alerts may be generated until the user 502 edits the offensive message so the offensive message no longer includes offensive content.

The positive keyword edit log 525f may maintain a log of the edits that a user 502 inputs in order to change an offensive message to a message that is no longer offensive. For instance, assume a user 502 inputs a message "I hate you" into text box 514 and taps "send." The input unit 525a may obtain the text of the message, transmit the obtained text to the content analysis unit 525d, which may determine that the message includes offensive content, and then the content analysis unit 525d may instruct the alert generation unit 525e to generate alert 530. When presented with alert 530, the user 502 may select the "edit" selectable icon 530c in order to edit the message before sending the message to the recipient. In one implementation, when the text of the message is presented in a text editor, the user 502 may delete the word "hate" and replace the word "hate" with the words "am upset with." The revised message now reads "I am upset with you." The user can instruct the device 510 to send the message, and the message analysis unit 525 may determine that the revised message, which reads "I am upset with you" no longer includes offensive content. In this example, the positive keyword edit log 525f may generate a positive keyword log entry that associates the word "hate" with the phrase "am upset with." This positive keyword log entry may be in the form of a data structure that includes, for example, a log id, at least a portion of the offensive content (e.g., "hate"), and at least a portion of the non-offensive content (e.g., "am upset" or "am upset with") that was used to replace the offensive content. Alternatively, or in addition, the positive keyword log entry may also include a user id that is indicative of the user that submitted the edit of a message that resulted in the generation of the positive keyword log entry. The positive keyword log entry may be stored in a positive keyword log entry library maintained by the message analysis unit 525.

Though the log entry is referred to as a positive keyword log entry, it is intended that the log entry may extend to more than just individual keywords. For instance, as the example above indicates, the positive keyword log entry may store a positive phrase that was used to replace offensive content.

The message analysis unit 525 may use the communications unit 525c in order to periodically transmit positive keyword log entries generated using the device 510 to the server 550 via the network 530 using one or more communication links 540a, 540b, 540c, 540d. Alternatively, or in addition, the message analysis unit 525 may use the communications unit 525c in order to periodically download positive keyword log entries from the server 550 via the network 530 using one or more communication links 540a, 540b, 540c, 540d that have been uploaded to the server 550 from other users of devices that include the features of device 510. Positive keyword log entries obtained from the server 550 may be stored on the device 510 with the positive keyword log entries generated by the positive keyword edit log 525f in a positive keyword log entry library. The positive keyword log entry library may be accessible to the keyword recommendation unit 525g.

Each of the one or more positive keyword log entries may be associated with a particular quality score. The quality score may consider a variety of factors including, for example, a confidence level, frequency of use, user that led to the generation of the positive keyword log entry, or the like. For instance, a confidence score may be determined that as one component of a quality score. The confidence score may be indicative of a likelihood that the non-offensive content in a particular positive keyword log entry adequately replaces the offensive content in the particular positive keyword log entry. The frequency of use component of the quality score may, for example, be based on the number of times that users who have uploaded positive keyword log entries to the server 550 have made the edit logged in a particular positive keyword log entry. High confidence scores and high frequencies of use will have a positive impact on a quality score associated with a particular positive keyword log entry. In a similar manner, low confidence scores and low frequencies of use will have a negative impact on a quality score associated with a particular positive keyword entry.

The quality score may also be influenced based on the user that generated a positive keyword log entry. For instance, a quality score for a particular positive keyword log entry may be higher for a particular positive keyword log entry stored on user device 510 if the user 502 of device 510 submitted the edit that generated the particular positive keyword log entry. Similarly, the quality score for a particular positive keyword log entry may be lower for particular positive keyword log entries stored on a user device 510 if the user 502 of the device 510 did not generate or submit the particular positive keyword log entry for inclusion in the positive keyword log entry library maintained by the device 510.

Keyword recommendation unit 525g may dynamically generate positive keyword recommendations to a user 502 based on the detection of potentially offensive content being entered into the text box 514. For instance, assume the user 502 is typing a message into the text box 514, and the user begins by typing "I hate." The content analysis unit 525d may determine that the message 514 includes potentially offensive content, and send an instruction to the keyword recommendation unit 525g in order to generate one or more positive keyword recommendations that may be used to replace the potentially offensive content. For instance, once a user finishes typing "I hate", the keyword recommendation unit may suggest a positive replacement for the word "hate" such as "am upset" or "am upset with".

The positive replacements recommended by the keyword recommendation unit 525g may be generated based on positive keyword log entries maintained in the positive keyword log entry library. For instance, the keyword recommendation unit 525g may receive one or more characters input into the device 510 from the input unit 525a and search the offensive content field of the positive keyword log entries in the positive keyword log entry library to identify one or more positive keyword log entries that have an offensive content field that corresponds to the potentially offensive text input into the device 510. Then, the keyword recommendation unit 525g may use the data in the non-offensive content field to generate one or more positive keyword recommendations. To the extent two or more positive keyword recommendations are identified, a set of one or more positive keyword recommendations may be selected based on the quality score associated with each positive keyword log entry. For instance, the subset of one or more positive keyword recommendations that have the highest quality scores may be selected.

The one or more positive keyword recommendations may be presented to the user as one or more selectable icons. In response to a selection of one of the selectable icons, the message analysis unit may replace the potentially offensive content with the positive keyword recommendation. Then the user 502 can complete, and send, the message. Upon instructing the user device 510 to send the message, the message analysis unit may analyze the message, as described above, to ensure that the message does not include offensive content.

In this example, the dynamic detection of potentially offensive content was discussed. In this instance, the content is described as potentially offensive content, and not offensive content, because the content analysis is being dynamically performed as the user 502 types the message. As the message is not yet finished, a complete determination of whether the message will ultimately include offensive content cannot be made. For instance, when complete, the context in which the offensive trigger word "hate" was used or the messages sentiment may result in the message being classified as not including offensive content. Accordingly, the dynamic generation of positive keyword replacement scans for potentially offensive content which may, or may not, be considered offensive content by the time the user 502 completes the message entered into text box 514.

Server 550 may include a trending offensive content discovery unit 552, a master offensive content library 554, and an aggregated positive keyword replacements library 556.

The trending offensive content discovery unit 552 may be configured to access data that has been obtained by one or more social media providers 570 via the network 530 using one or more communications links 540a, 540b, 540c, 540d. The trending offensive content discovery unit 552 may facilitate identification of content that is being used in a way that is offensive. Alternatively, or in addition, the trending offensive content discovery unit 552 may identify content that was previously used as offensive content but is no longer being used as offensive content. Trending offensive content discovery unit 552 may identify such content by obtaining data that one or more users of social media have uploaded to one or more social media providers, and analyzing that obtained data in order to identify trends that exist in the use of words by users of social media sites provided by one or more social media providers 570. The trending content discovery module 552 may include one or more customized APIs that are configured to interface with databases provided by one or more social media providers 570.

Once the content is obtained by the trending offensive content discovery unit 552, data mining and machine learning algorithms may be applied to the obtained data in order to identify new trends in the way that words are used. Alternatively, or in addition, one or more expert users 560 may access the obtained data via network 530 using one or more communication links 540a, 540b, 540c, 540d and analyze the obtained data. The expert users 560 may then determine, based on their analysis, whether any new trends exist where a particular word, phrase, image, audio, or video are being used in an offensive way. Alternatively, the expert users 560 may determine whether there was previously offensive words, phrases, images, audios, or videos that are no longer being used in an offensive way. The analysis performed by the data mining algorithms, machine learning algorithms, expert analysis, or any combination thereof may result in the identification of one or more types of content that should be added to the master offensive content library 554, one or more types of content that should be removed from the master offensive content library 554, or both. The master offensive content library 554 may be periodically updated over time, in this manner, as new trends in content use are discovered. Once updated, the master offensive content library 554 may be propagated to one or more user devices 510. The offensive content library 525b of each respective user device 525 may be updated either fully, or incrementally, based on changes to the master offensive content library 554 to ensure that the offensive content library 525b of a respective device 510 stays current with the most recent content use trends.

The server 550 may also maintain an aggregated positive keyword replacements library 556. The aggregated positive keyword replacements library 556 may include positive keyword log entries submitted by multiple different users of multiple different user devices such as user device 510. Once populated with positive keyword log entries from multiple different users, the positive keyword log entries stored in the aggregated positive keyword replacements library 556 may be propagated to one or more user devices 510 in order to update the positive keyword log entry library of each respect user device 510. Thus, the keyword recommendation unit 525g of a particular user device 510 may generate positive keyword recommendations based on positive keyword log entries generated from different users of different devices.

The user device 510 may be configured to communicate with the server 550 via the network 530 using one or more communication links 540a, 540b, 540c, 540d. The network 530 may include one or multiple networks such as, for example, a LAN, WAN, 3G network, 4G network, the Internet, or the like. Each communication link 540a, 540b, 540c, 540d may include one or more wired, or wireless connections that facilitate connection of the user device 510 or server 550 to the network 530.

The examples above have generally been related to the use of the message analysis unit 525 to intercept and analyze outgoing messages that have been composed, and sent, by the user 502 of the user device 510. However, the present disclosure need not be so limited. Instead, the message analysis unit 525 may also be used to intercept and analyze incoming messages that were composed, and sent, by a user of another device.

For instance, the message analysis unit 525 may also be used to intercept and analyze incoming messages, including text messages, picture messages, audio message, video messages, social media posts, and the like for offensive content. In one implementation, for example, an incoming message may be detected, and the input unit 525a may obtain one or more portions of the incoming message content, the content analysis unit 525c may be able to analyze the obtained message content to determine if the obtained message content includes offensive content. If the incoming message is determined to include offensive content, the alert generation unit 525e may generate an alert asking user 502 whether the user 502 wants to accept the incoming message. The generated alert may provide the user with interactive options such as a discard option which will delete the incoming message without displaying the offensive content and a view option which will display the incoming offensive message to the user 502. In determining whether an incoming message is offensive, the content analysis unit 525d may, for example, determine whether one or more offensive trigger words fall within a predetermined proximity of the name, or a pronoun referring to, the user 502. Sentiment analysis may also be performed on incoming messages using, for example, one or more trained neural networks.

Figure 6:
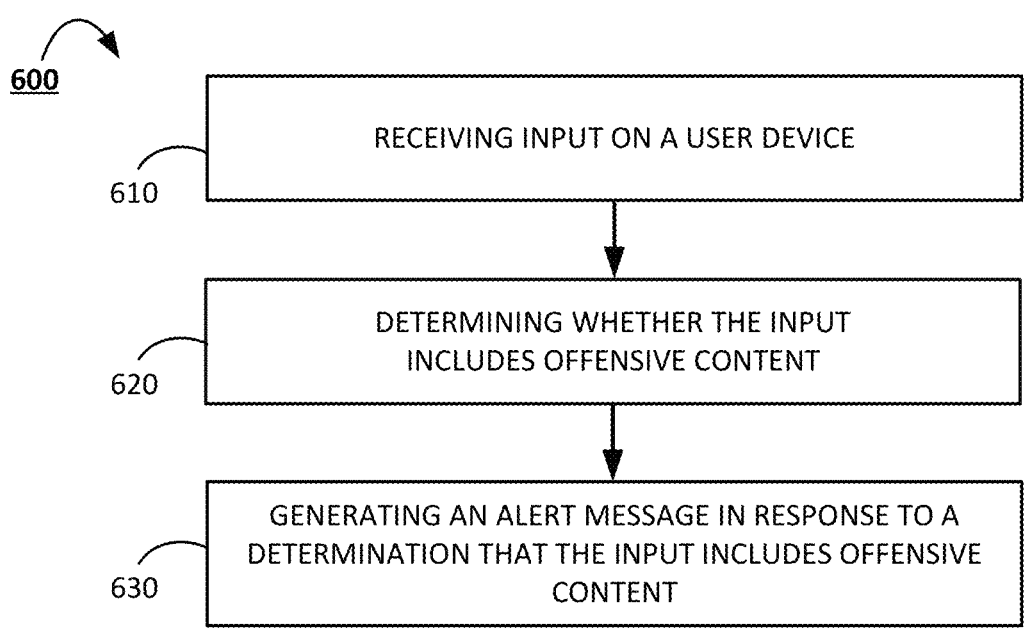
FIG. 6 is a flowchart of an example of a process for analyzing a message for offensive content.

FIG. 6 is a flowchart of an example of a process 600 for analyzing a message for offensive content. The process 600 may be performed by a message analysis unit 525 executing on a user device 510.

The process 600 may begin when a user uses a keyboard of a user device to create a message. Alternatively, the process 600 may begin when the user inputs a message by uttering one or more voice commands. The message may include a text string of one or more characters, one or more images, one or more videos, one or more audios, or a combination thereof. The message analysis unit may obtain the message, or a portion thereof, at stage 610. For instance, the message analysis unit may obtain data on a character-by-character basis, a word-by-word basis, or the like. Alternatively, for example, the message analysis unit may obtain only metadata associated with an image, audio, or video file. Alternatively, for example, the message analysis unit may obtain the entire text content of a message.

After obtaining the message, or a portion thereof, the message analysis unit may determine at stage 620 whether the message includes offensive content. The message analysis unit may be capable of analyzing a particular message in one or more different ways. For instance, the message analysis unit may analyze the words of a message to determine whether the message includes one or more potentially offensive trigger words. Alternatively, or in addition, the message analysis unit may perform a contextual analysis of a message. Contextual analysis of a message may include, for example, analyzing the context in which a potentially offensive trigger word is used. Alternatively, or in addition, the message analysis unit may perform an analysis of a message's sentiment. In one implementation, determining a message's sentiment may include the use of artificial intelligence techniques such as machine learning.

In some instances, the message analysis unit may determine that a message includes offensive content. After determining that a message includes offensive content, the message analysis unit can generate 630 an alert message. The alert message may ask a user of the device that sent the message to confirm whether the user wants to send the message. The alert may include one or more options for interacting with a message that has been detected as including offensive content. For instance, an alert may include one or more selectable icons that a user can select in order to discard the message, confirm that the message should be sent, or edit the message.

Figure 7:
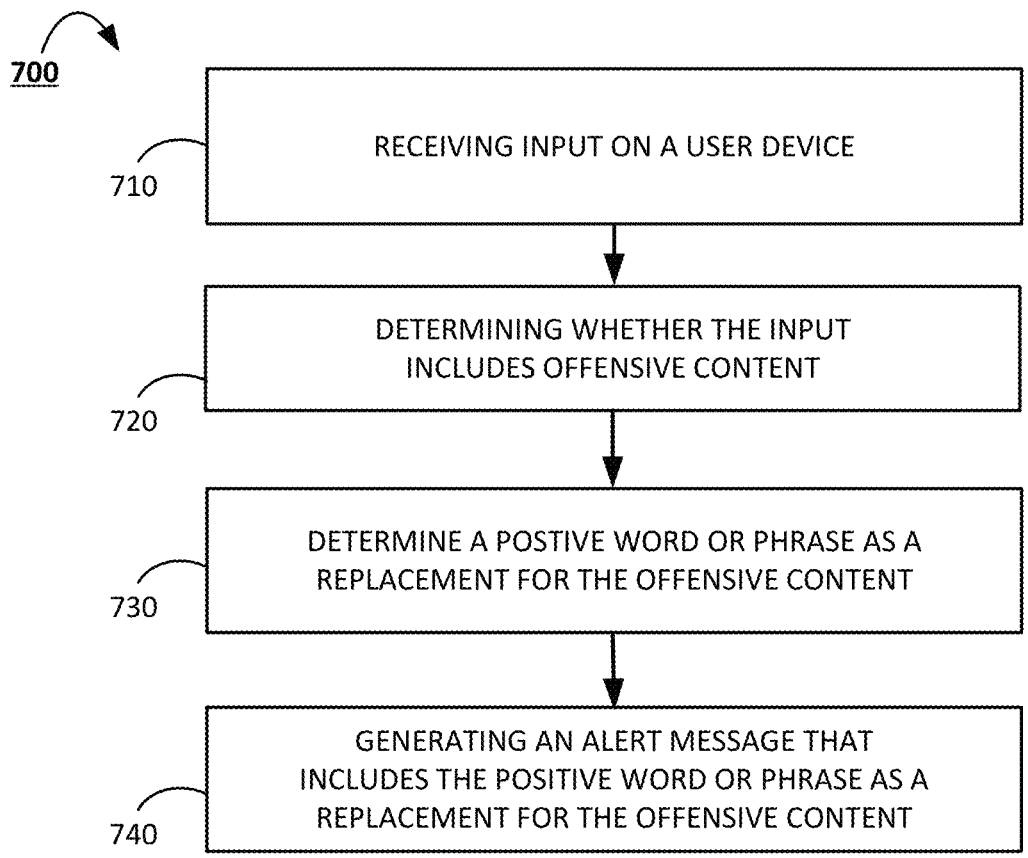
FIG. 7 is a flowchart of an example of a process for generating an alert message that includes a recommendation for replacing offensive content detected in a message.

FIG. 7 is a flowchart of an example of a process for generating an alert message that includes a recommendation for replacing offensive content detected in a message. The process 700 may be performed by one or more components of system 500 above.

The process 700 may begin when a user uses a keyboard of a user device to create a message. Alternatively, the process 700 may begin when the user inputs a message by uttering one or more voice commands. The message may include a text string of one or more characters, one or more images, one or more audios, one or more videos, or a combination thereof. The message analysis unit may obtain the message, or a portion thereof, at stage 710. For instance, the message analysis unit may obtain data on a character-by-character basis, a word-by-word basis, or the like. Alternatively, for example, the message analysis unit may obtain only metadata associated with an image, audio, or video file. Alternatively, for example, the message analysis unit may obtain the entire text content of a message.

After obtaining the message, or a portion thereof, the message analysis unit may determine at stage 720 whether the message includes offensive content. The message analysis unit may be capable of analyzing a particular message in one or more different ways. For instance, the message analysis unit may analyze the words of a message to determine whether the message includes one or more potentially offensive trigger words. Alternatively, or in addition, the message analysis unit may perform a contextual analysis of a message. Contextual analysis of a message may include, for example, analyzing the context in which a potentially offensive trigger word is used. Alternatively, or in addition, the message analysis unit may perform an analysis of a message's sentiment. In one implementation, determining a message's sentiment may include the use of artificial intelligence techniques such as machine learning.

In some instances, the message analysis unit may determine that a message includes offensive content. After determining that a message includes offensive content, the message analysis unit may determine 730 a positive word or phrase that can be used to replace offensive content in the message. For instance, assume that a message analysis unit determines that a message includes offensive content such as "I hate you." The message analysis unit may determine a suggested replacement message that includes a positive keyword replacement for offensive trigger word "hate" such as "do not like." The suggested replacement message may be determined based on positive keyword log entries generated by the message analysis unit. In one implementation, the message analysis unit may select a positive keyword replacement using a particular positive keyword log entry from a set of multiple positive keyword log entries based on a positive keyword log entry quality score.

At stage 740, the message analysis unit may generate 740 an alert message. In one implementation, the alert message can ask a user of the device that sent the message to confirm whether the user wants to send the message. In addition, in one implementation, the alert may also include a suggested replacement message that includes a positive keyword replacement for the offensive content detected in the message. For instance, the alert generated at stage 740 can recite "This message may be offensive. We recommend sending the following message instead: I do not like you." Though "I do not like you" still has a negative connotation, "I do not like you" would likely be perceived to be less negative than "I hate you." In response to this alert, the user can decide to accept and send the suggested message, ignore the suggestion and send the message with offensive content, discard the message without sending the message, or edit the message and trying sending the message again.

Figure 8:
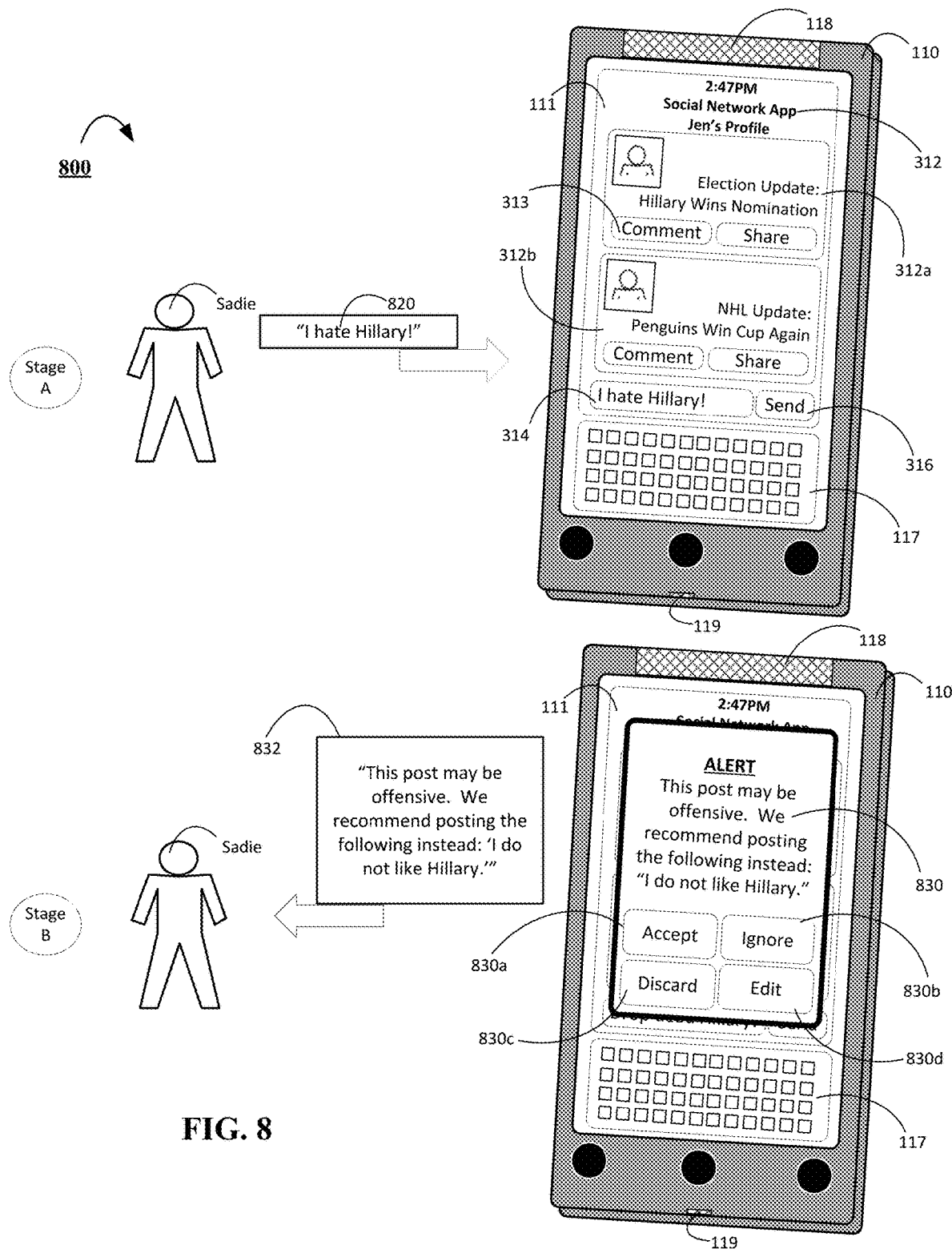
FIG. 8 is an example of generating an alert message that includes a recommendation for replacing offensive content detected in a message.

FIG. 8 is an example 800 of generating an alert message that includes a recommendation for replacing offensive content detected in a message. The example of 800 is a particular example of a user device 110 that implements the process 700.

In example 800, Sadie is communicating a message in the form of a comment related to a content item posted to Jen's social media page via a social media application 312 executing on Sadie's enhanced mobile device 110.

As previously described, Sadie can submit a comment on a content item such as content items 312*a*, 312*b* posted to Jen's social media page. Sadie may submit the comment to a content item 312*a* by, for example, tapping the selectable comment icon 313 and then entering a set of one or more characters into the text box 314 using a keyboard 117 that is installed on the enhanced user device 110. The keyboard 117 may be a default keyboard that was part of the standard software package installed on the enhanced user device 110. Alternatively, the keyboard 117 may be a custom keyboard that includes one or more software units that can analyze messages for offensive content. Alternatively, or in addition, in some implementations, Sadie can enter a comment into the text box 314 by uttering a voice command that is captured by a microphone 119 of the mobile device 110.

Sadie may initiate transmission of the comment entered into the text box 314 by selecting the send button 316 using, e.g., a finger tap on a graphical user interface 111 of the enhanced user device 110. In some instances, after the send button 116 is selected, the one or more characters residing within the text box 114 can be transmitted from Sadie's enhanced user device 110 to a server computer associated with the provider of the social media application 312, and posted to corresponding content item on Jen's social media profile page.

At stage A of example 800, Sadie may become angry when browsing content items posted to Jen's social media page. For instance, Sadie, an avid conservative, may become angry upon viewing the content on Jen's social media page indicating that "Hillary wins Nomination." Angering Sadie further is the fact that Sadie knows Jen is an avid Hillary supporter. Consumed with anger, and wanting to hurt Jena and Hillary Clinton at the same time, Sadie enters the comment 820 "I hate Hillary!" into text box 314 and taps the send button 316.

At Stage B of example 300, Sadie's enhanced user device 110 can analyze the comment 820 input into the text box 314, and determine whether the comment 820 includes offensive content. The enhanced user device 110 may determine whether the comment 820 includes offensive content. With reference to example 800, the enhanced user device 110 can determine that the message 820 includes an offensive trigger word "hate" that is within a predetermined proximity of the name of another person. In this example, the user device 110 has determined that the message 820 includes an offensive trigger word "hate" that is within a predetermined proximity of the name "Hillary," who is not the sender of the message. Accordingly, the enhanced user device 110 can conclude that the comment 820 includes offensive content.

After determining that the comment 820 includes offensive content, the enhanced user device 110 may identify a positive keyword replacement for the offensive content in comment 820. The enhanced user device 110 may identify a positive keyword replacement for offensive content by searching positive keyword log entries maintained by the user device 110. In this instance, the enhanced user device 110 may select the positive keyword replacement "do not like" as a replacement for "hate." Such a replacement may make the comment less offensive because "do not like" may have less of a negative connotation than "hate."

The enhanced user device 110 may generate an alert 830 that indicates that the comment may include offensive content and a suggested replacement message. For instance, the alert may indicate that "This post may be offensive. We recommend posting the following instead: I do not like Hillary." The alert may include one or more options for interacting with the offensive message. For instance, the alert may provide options to post the suggested message 830*a*, post the offensive comment 830*b*, delete the offensive comment without posting 830*c*, and edit the comment before posting 830*d*.

Figure 9:
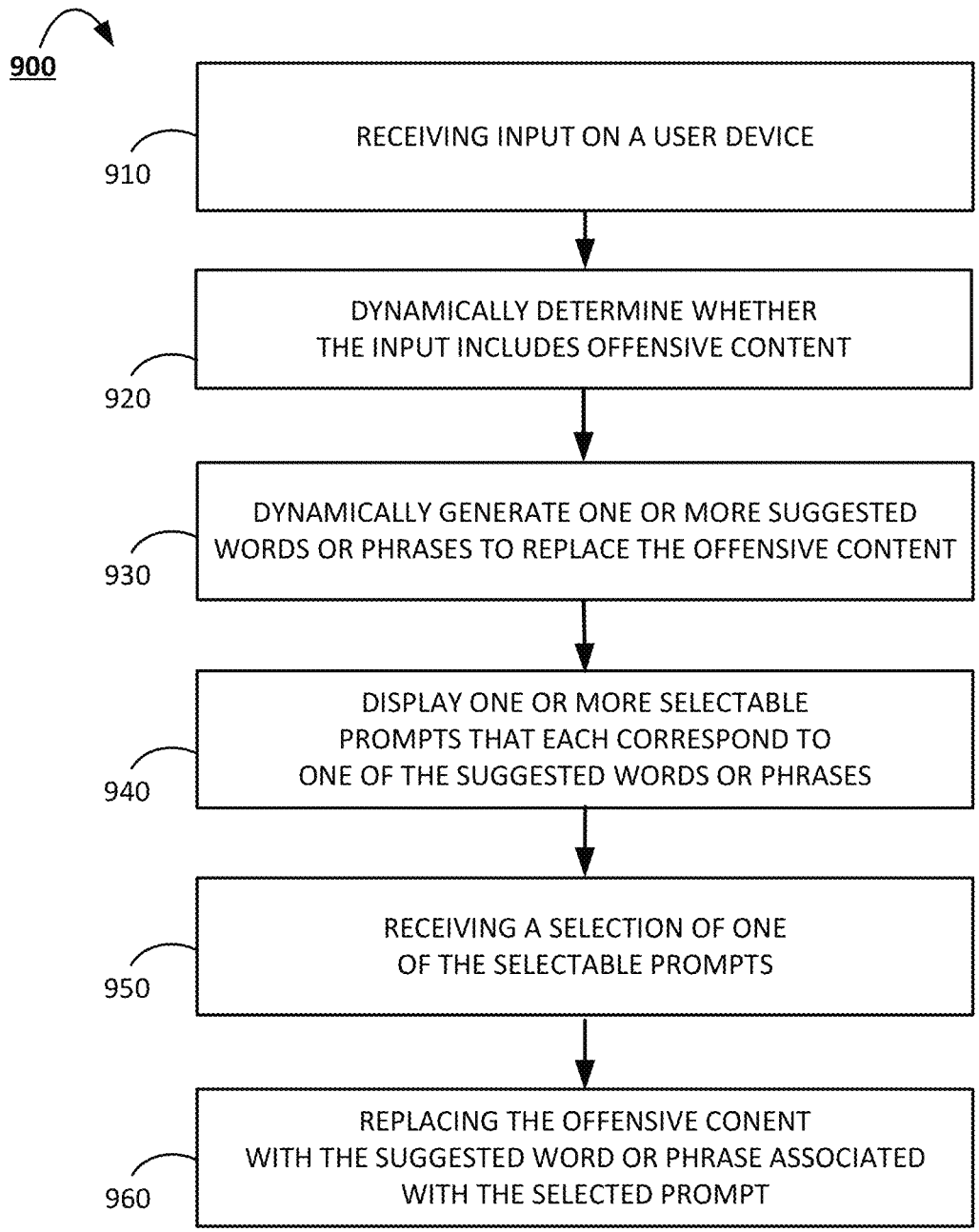
FIG. 9 is a flowchart of a process for dynamically generating a recommendation for replacing offensive content being entered into a user device.

FIG. 9 is a flowchart of a process 900 for dynamically generating a recommendation for replacing offensive content being entered into a user device. The process 900 may be performed by one or more components of system 500 above.

The process 900 may begin when a user uses a keyboard of a user device to create a message. Alternatively, the process 900 may begin when the user inputs a message by uttering one or more voice commands. The message may include a text string of one or more characters, one or more images, one or more audios, one or more videos, or a combination thereof. The message analysis unit may obtain the message, or a portion thereof, at stage 910. For instance, the message analysis unit may obtain data on character-by-character basis, a word-by-word basis, or the like. Alternatively, for example, the message analysis unit may obtain only metadata associated with an image, audio, or video file. Alternatively, for example, the message analysis unit may obtain the entire text content of a message. In one example, a user may begin entering the message "I hate you" into a text input box of a user device.

After obtaining the message, or a portion thereof, the message analysis unit may dynamically determine at stage 920 whether the message includes offensive content while the user is entering the message into a text box of a user device. The message analysis unit may be capable of analyzing a particular message in one or more different ways. For instance, the message analysis unit may analyze the words of a message to determine whether the message includes one or more potentially offensive trigger words. Alternatively, or in addition, the message analysis unit may perform a contextual analysis of a message. Contextual analysis of a message may include, for example, analyzing the context in which a potentially offensive trigger word is used. Alternatively, or in addition, the message analysis unit may perform an analysis of a message's sentiment. For example, determining a message's sentiment may include the use of artificial intelligence techniques such as machine learning. In one example, the message analysis unit may determine that the message "I hate you" includes offensive content in the form of the offensive trigger word "hate." At stage 920, the message analysis unit may dynamically make the determination that the message includes offensive content as the user is typing the message into text box and before the user hits send, post, or the like to try and initiate transmission of the message.

At stage 930, the message analysis unit may dynamically generate a suggested keyword or phrase that can be used to replace the offensive content. For example, the message analysis unit may determine that a suggested phrase "am upset with" may be recommended as a suggested replacement for "hate" in the message "I hate you" that was input into the user device's text box. The message analysis unit may select a suggested keyword or phrase that can be used to replace offensive content based on a search and analysis of positive keyword log entries maintained on the user's device. In some instances, multiple suggested keywords or phrases may be identified as being candidates for replacing offensive content. However, the message analysis unit may also select one or more of the suggested keywords or phrases of the multiple suggested keywords or phrases based on a quality score that is associated with the positive keyword log entries.

At stage 940, the message analysis unit may instruct a user's device to display one or more selectable prompts that each correspond to a particular suggested word or suggested phrase that can be used as a replacement for offensive content identified in the message. By way of the continuing example of process 900, the message analysis unit may instruct a user's device to display a selectable prompt that corresponds to the suggested phrase "am upset with." In one implementation, the suggested words or phrases may be displayed as a pop-up icon within a predetermined proximity of the offensive content that has been identified in the text box of the user device. In some implementations, the message analysis unit may also annotate the portion of the message that is deemed to be a candidate for replacement due to the candidate content's offensive nature. For instance, in one implementation, the content in the message that is deemed to be offensive may be underlined, bolded, highlighted, or the like. By way of example, in the message "I hate you," the message analysis unit may annotate the word "hate."

At stage 950 the message analysis unit may receive a selection of one of the selectable prompts. For instance, the user may select the selectable prompt that corresponds to the suggested phrase "am upset with." In response to the selection, the message analysis unit may replace the offensive content "hate" with the suggested phrase "am upset with." The modified message in the text box of the user device will now read "I am upset with you."

Figure 10:
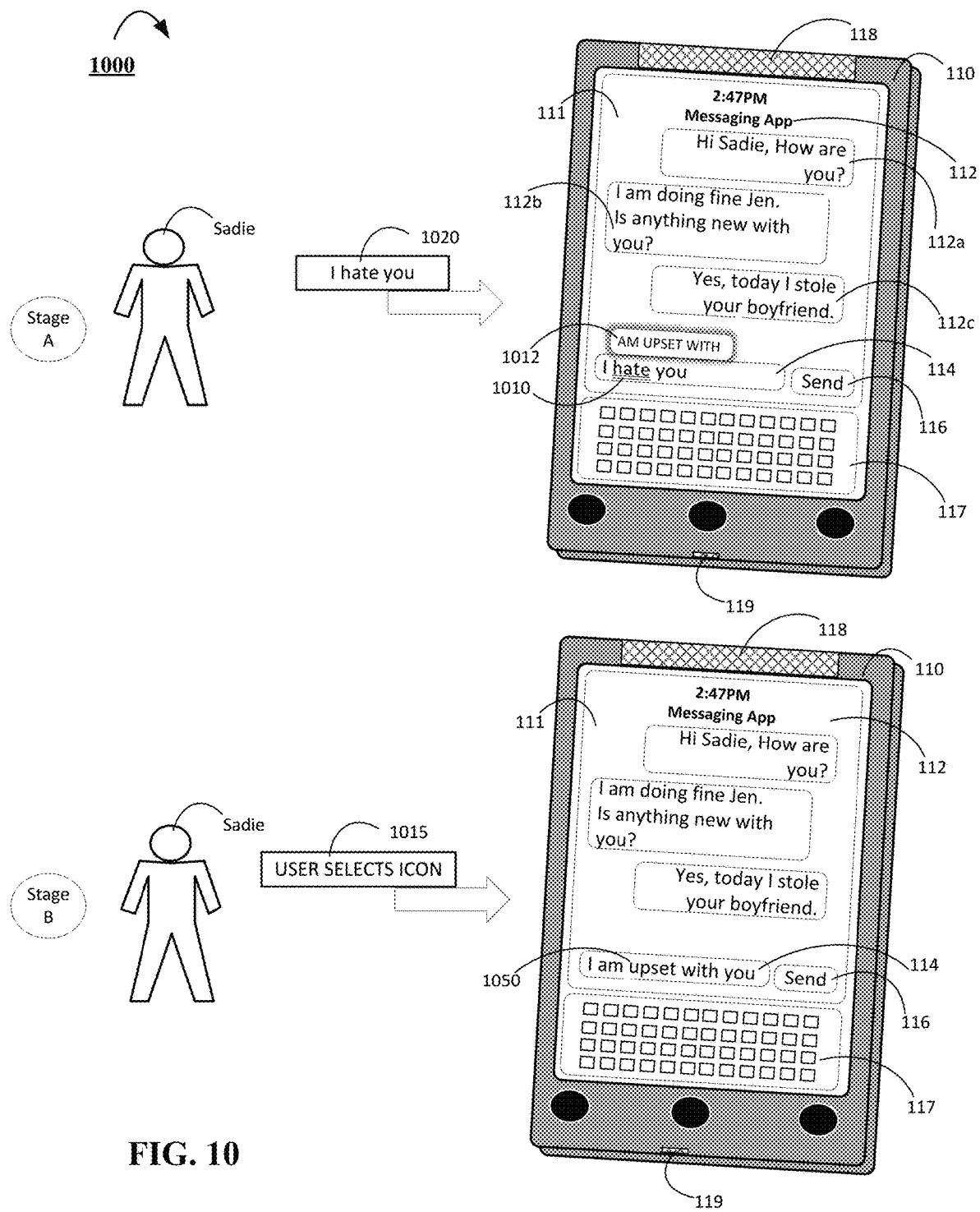
FIG. 10 is an example of dynamically generating a recommendation for replacing offensive content being entered into a user device.

FIG. 10 is an example 1000 of dynamically generating a recommendation for replacing offensive content being entered into a user device. In the example 1000, Sadie is using a message application 112 running on an enhanced user device 110 in order to exchange messages such as messages 112a, 112b, 112c with a user of another device named Jen.

In one implementation, a user device 110 enhanced with a message analysis unit in accordance with this specification can dynamically analyze a message for offensive content as the message is input into a text box 114. For instance, at stage A of example 1000, Sadie has input the message "I hate you" into text box 114. As the message is being typed into the text box 114, the message analysis unit can dynamically analyze the message content. The message analysis unit may analyze the message content on a character-by-characters basis, word-by-word basis, phrase-by-phrase basis, or a combination thereof. As the message is being analyzed, the message analysis unit can dynamically detect that the message 1020 includes offensive content. For instance, with reference to example 1000, the message analysis unit determines that the message 1020 includes the offensive trigger word "hate" that falls within a predetermined proximity of a pronoun that references the recipient of the message 1020.

In response to dynamically identifying offensive content in the message, the message analysis unit may annotate 1010 the offensive content in the message and identify one or more suggested keywords or phrases that can be used to replace the offensive content. The one or more suggested keywords or phrases may be generated based on a search and analysis of positive keyword log entries maintained by the user device 110. In this example, the message analysis unit has identified the suggested keyword phrase "am upset with" as being a candidate replacement phrase for the offensive content "hate." Once the one or more suggested keywords or phrases have been identified, the message analysis unit may instruct the enhanced user device 110 to display a selectable icon 1012 that corresponds to the suggested keyword or phrase.

Sadie may determine that the suggested keyword or phrase would more positively communicate her feelings to Jen. For instance, Sadie may determine, upon reviewing the suggested keyword, that she doesn't really hate Jen. Instead, it is more accurate for Sadie to convey the fact that Sadie's feelings have been hurt by Jen's actions, and as a result, Sadie is upset with Jen. Accordingly, Sadie may select 1015 the selectable icon 1012 in order to replace the offensive content in the message 1020 with a positive keyword replacement. In response to a selection of the selectable icon 1012, the message analysis unit may revise the offensive portion of the message 1020 with the selected positive keyword replacement to create a revised message 1050 that recites "I am upset with you." Sadie can then tap "send" 116 in order to send the revised message. In one implementation, the message analysis unit may not further analyze the revised message for offensive content after Sadie taps "send" 116 to initiate transmission of the revised message since the revised message was dynamically analyzed for offensive content. Alternatively, however, other implementations may employ the message analysis unit to analyze the revised message in accordance with the features of the disclosure discussed herein after Sadie taps "send"116 to initiate transmission of the revised message.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A method comprising:
    receiving, by one or more computers, first data that represents message content and is derived from input data input to a first user device by a user;
    determining, by one or more computers and prior to communication of second data to a second user device that, when processed by the second user device, causes the second user device to display the message content on a display of the second user device, whether the first data represents message content that is likely offensive content, wherein determining whether the received first data represents message content that is likely offensive content comprises:
        providing, by one or more computers, at least a portion of the received first data to a machine learning model that has been trained to detect a likelihood that a message includes offensive content; and
        obtaining, by one or more computers, output data that was generated by the machine learning model based on the machine learning model processing the provided first data;
    in response to determining, by one or more computers and based on the obtained output data, that the first data represents message content that is likely offensive content, generating alert data that, when processed by the first user device, causes the first user device to display (i) an indication that the message content includes offensive content and (ii) a prompt that asks the user to confirm that the second data is to be communicated to the second user device; and
    providing, by one or more computers, the generated alert data to the first user device.

2. The method of claim 1, wherein the message content is content of a comment on a social media post.

3. The method of claim 1, wherein the machine learning model is trained using one or more content items that have been labeled as offensive content items and one or more content items that have been labeled as non-offensive content items.

4. The method of claim 1, wherein the message content includes text content, image content, or video content.

5. The method of claim 1,
    wherein the alert data includes data that, when processed by the user device, causes the user device to display a visual representation of one or more options to the user, of the user device, for interacting with the message content.

6. The method of claim 5, wherein the one or more options for interacting with the message content include (i) discarding the message content, (ii) communicating the message content, and (iii) editing the message content.

7. A system comprising:
    one or more computers and one or more storage devices storing instructions that are operable, when executed by the one or more computers, to cause the one or more computers to perform operations comprising:
        receiving, by one or more computers, first data that represents message content and is derived from input data input to a first user device by a user;
        determining, by one or more computers and prior to communication of second data to a second user device that, when processed by the second user device, causes the second user device to display the message content on a display of the second user device, whether the first data represents message content that is likely offensive content, wherein determining whether the received first data represents message content that is likely offensive content comprises:
            providing, by one or more computers, at least a portion of the received first data to a machine learning model that has been trained to detect a likelihood that a message includes offensive content; and
            obtaining, by one or more computers, output data that was generated by the machine learning model based on the machine learning model processing the provided first data;
        in response to determining, by one or more computers and based on the obtained output data, that the first data represents message content that is likely offensive content, generating alert data that, when processed by the first user device, causes the first user device to display (i) an indication that the message content includes offensive content and (ii) a prompt that asks the user to confirm that the second data is to be communicated to the second user device; and providing, by one or more computers, the generated alert data to the first user device.

8. The system of claim 7, wherein the message content is content of a comment on a social media post.

9. The system of claim 7, wherein the one or more computers includes the first user device.

10. The system of claim 7, wherein the machine learning model is trained using one or more content items that have been labeled as offensive content items and one or more content items that have been labeled as non-offensive content items.

11. The system of claim 7, wherein the machine learning model comprises one or more neural networks.

12. The system of claim 7, wherein the message content includes text content, image content, or video content.

13. The system of claim 7, wherein the alert data includes data that, when processed by the user device, causes the user device to display a visual representation of one or more options to the user, of the user device, for interacting with the message content.

14. The system of claim 13, wherein the one or more options for interacting with the message content include (i) discarding the message content, (ii) communicating the message content, and (iii) editing the message content.

15. A non-transitory computer-readable medium storing software comprising instructions executable by one or more computers which, upon such execution, cause the one or more computers to perform operations comprising:

receiving, by one or more computers, first data that represents message content and is derived from input data input to a first user device by a user;

determining, by one or more computers and prior to communication of second data to a second user device that, when processed by the second user device, causes the second user device to display the message content on a display of the second user device, whether the first data represents message content that is likely offensive content, wherein determining whether the received first data represents message content that is likely offensive content comprises:

providing, by one or more computers, at least a portion of the received first data to a machine learning model that has been trained to detect a likelihood that a message includes offensive content; and obtaining, by one or more computers, output data that was generated by the machine learning model based on the machine learning model processing the provided first data;

in response to determining, by one or more computers and based on the obtained output data, that the first data represents message content that is likely offensive content, generating alert data that, when processed by the first user device, causes the first user device to display (i) an indication that the message content includes offensive content and (ii) a prompt that asks the user to confirm that the second data is to be communicated to the second user device; and providing, by one or more computers, the generated alert data to the first user device.

16. The computer-readable medium of claim 15, wherein the message content is content of a comment on a social media post.

17. The computer-readable medium of claim 15, wherein the alert data includes data that, when processed by the user device, causes the user device to display a visual representation of one or more options to the user, of the user device, for interacting with the message content.

18. The computer-readable medium of claim 15, wherein the message content includes text content, image content, or video content.

19. The computer-readable medium of claim 15, wherein the machine learning model is trained using one or more content items that have been labeled as offensive content items and one or more content items that have been labeled as non-offensive content items.

20. The computer-readable medium of claim 15, wherein the message content includes text content, image content, or video content.

* * * * *